Nov. 7, 1967 I. H. McGUIRE 3,351,409
LIGHT DIFFUSION MATERIAL, METHOD OF MAKING AND USING SAME
Filed June 12, 1963 2 Sheets-Sheet 1

INVENTOR
IRVIN H. McGUIRE

BY Beale and Jones
ATTORNEYS

Nov. 7, 1967        I. H. McGUIRE        3,351,409
LIGHT DIFFUSION MATERIAL, METHOD OF MAKING AND USING SAME
Filed June 12, 1963        2 Sheets-Sheet 2
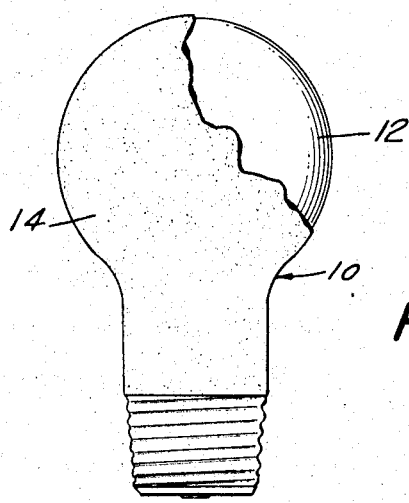
FIG. 3
FIG. 4
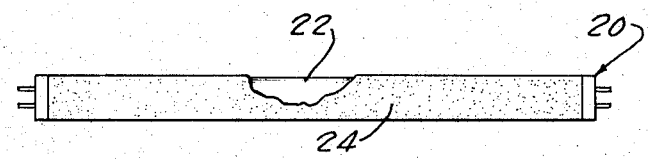
FIG. 5
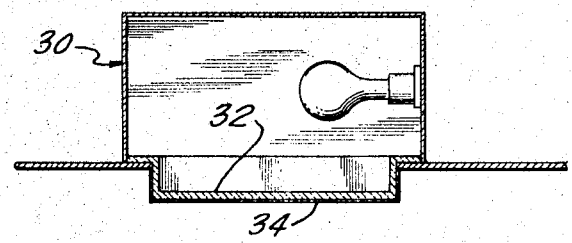
INVENTOR
IRVIN H. McGUIRE
BY Beale and Jones
ATTORNEYS 3,351,409
LIGHT DIFFUSION MATERIAL, METHOD OF
MAKING AND USING SAME
Irvin H. McGuire, Box 15, High Shoals, Ga. 30645
Filed June 12, 1963, Ser. No. 287,302
12 Claims. (Cl. 350—117)

This invention relates to a light diffusion material. More particularly it relates to a light diffusion material that may be applied as a coating to a surface to produce 100% light diffusion, and which provides a material for coating rear projection types of screens which gives improved light transmission and image contrast.

Light diffusion materials and screens are well known in the art. The light diffusion is commonly obtained by incorporating finely divided pigments in a plastic mass or by etching, embossing, or grooving at least one surface of a substrate, such as plastic or glass.

Various methods have been proposed to increase the amount of light diffusion with some success. U.S. Patent 2,443,918, Gustore et al. and U.S. Patent 2,706,262, Barnes, show screens that are coated or have light diffusion material incorporated therein to improve their light diffusion properties. These references also show methods for producing such screens. U.S. Patent 2,726,573, Maloff, and U.S. Patent 2,934,998, Beard, teach methods of making improved projection screens where at least one surface of a transparent substrate has been etched or grooved.

The disadvantages of prior art screens are that the percentage of light diffusion of transmitted light has not come reasonably close to 100%, and uniform distribution of light diffusion is not produced. For translucent or rear projection types or screens, the image is not always sharp, particularly over the entire surface of the screen.

The present invention has for its object the provision of a novel light diffusion material that may be applied as a coating to a substrate.

Another object is to provide a composition to be deposited in the form of a film on a substrate to diffuse light.

A further object of the invention is to provide a rear projection viewing screen with about 100% light diffusion, having improved light transmission and image contrast.

Yet another object of the invention is to provide a light diffusion device to be interposed between a light source, such as a fluorescent or incandescent light, and the area being illuminated.

Still another object is to provide a light illuminating source that has a film of the novel composition of the invention on its envelope, that produces light diffusion approaching 100%.

The present invention gives nearly 100% light diffusion whereby previous methods involving coatings, films or solutions gave about 30 to 40%. The improved diffusion of light according to the present invention gives just as good brightness at the edges of a screen as at the center and improves the over all sharpness and contrast of any image focused on a layer, film, or sheet of the light diffusion material.

The ingredients used in making the improved light diffusion material are:

(1) Kaolin, consisting of particles of less than one micron in size, which has been heated to about 1800° F. to remove bound water and free water, volatile materials and gases such as oxygen, nitrogen, and hydrogen, and decompose organic materials, if present, 98% of said kaolin having a particle size of one micron or less, is the crystalline material used in making the light diffusion material. Further discussion of the kaolin used, preferably Georgia kaolin, is given below. The aluminum oxide content of the kaolin before dehydration is about 38% and after dehydration is about 47%. As is known in the art, bound water is removed from kaolin at temperatures of between about 750° F. and about 1200° F. although according to the present invention, however, best results are obtained by heating said kaolin to about 1800° F.

(2) A clear organic binder, preferably clear acrylic lacquer or paint, is used to adhere the crystalline particles to the substrate.

(3) An organic thinner or solvent, preferably clear acrylic paint thinner is used.

(4) Particularly for projection screens, carbon black is used to give the light diffusion material better contrast characteristics.

Example

Georgia kaolin, from Sandersville, Ga., containing about 38% aluminum oxide and having the probable formula of $Al_2O_3 \cdot 2H_2O \cdot 2SiO_2$, with small amounts of other minerals such as $TiO_2$, was heated to about 1800° F. for a period of 30 minutes to 60 minutes. After the heating or calcining process the kaolin had a probable formula of $Al_2O_3 \cdot 2SiO_2$ and contained about 47% aluminum oxide. The kaolin was such that about 98% had a particle size of 1.0 micron or less. The kaolin, two parts by volume, was suspended in clear acrylic paint thinner, one part by volume, and centrifuged, and a fraction containing more than 2% of the kaolin as particles larger than 1 micron was discarded. The kaolin suspension was agitated and mixed with an equal volume of clear acrylic paint. Such paints commonly contain about 20% resin and 80% solvent, by weight, with small amounts of plasticizers and stabilizers. The product used was "Acrylic Base Paint— 'Clear,'" made by the Glidden Co. The agitation was maintained during the mixing. The suspension of the kaolin was stabilized by slowing down the agitation, and mixing until settling was minimized. In order to give the light diffusion material better contrast charactertistics, carbon black was added, in the form of a carbon black suspension. The suspension consisted of 10% carbon black and 90% clear acrylic paint, by volume, containing acrylic resin and solvent. The carbon black suspension was added to the kaolin and acrylic paint mixture, while it was still being agitated. The suspension contained 50% suspended inorganic solids containing 49.0% kaolin and 0.1% carbon black, and 50 parts acrylic paint, by volume.

A sheet of transparent plastic material made of "Plexiglas" and being about 1/16 inch in thickness, was coated with a thin film of the kaolin, acrylic paint and carbon black mixture by spraying at 40 pounds air pressure to give a dry film of about 2 microns in thickness. Benzene, toluene, bromobenzene, butyl acetate or methylethyl ketone are suitable thinners or solvents for acrylate resins. "Plexiglas" is the trademark for a material composed of polymethylmethacrylate. The product was a translucent projection screen with excellent contrast and brightness of an image projected from the rear of the screen, with the coated side either toward or away from the projector.

Both the substrate and the organic binder are preferably water white. Thus, glass or "Lucite" (a trademark for polymethylmethacrylate) are suitable substrates, and the latter is also an excellent binder.

Other substrates that may be used are transparent or translucent materials made of polyester resins, epoxy resins, celluloid, colored glass, thin sheets of glass fibers, and other conventional materials. For example, U.S. Patent No. 2,193,035 shows polyvinyl acetaldehyde and polyvinyl acetate materials that may be used as a substrate.

Other common translucent or transparent structures, such as of cellulose acetate, cellulose propionate, cellulose butyrate, cellulose acetate propionate, cellulose acetate-butyrate and other cellulose organic acid ester plastics, such as the ones disclosed in U.S. Patent No. 3,031,321, may be used. Other substrates are well known to the art.

The binder used may be of any clear or translucent, non-deteriorating composition which will form a film and harden, such as material made of phenol formaldehyde resin, epoxy resins, polyester resins and cellulose acetate, as described in U.S. Patent No. 2,706,262; alkyd resin enamel, nitrocellulose, and copolymers of methyl methacrylate with butoxyethyl methacrylate, methyl methacrylate copolymer and nitrocellulose, 3,055,851; acrylic resins, 3,037,955; polyvinyl acetate, 3,010,929; methyl methacrylate, 1,937,323; 1,980,483, and 2,989,492; and epoxy resins, 2,987,498. Other suitable compositions that may be used as binding materials are given in Handbook of Plastics, Herbert R. Simonds et al. 1943, pp. 450–451. The preferred binder is the clear acrylic paint "Acrylic Base Paint—'Clear'" made by the Glidden Company.

The proportions of ingredients of the kaolin-containing mixture may vary and are not particularly critical. The important aspect is to disperse the kaolin crystals on the surface of the substrate. According to the example, approximately a 50%–50% mixture by volume, of kaolin and binder solution, is preferred because it was found to be the easiest and most convenient to use. The variation in the proportion of kaolin to acrylic paint will be determined by the amount of kaolin crystals to binder desired by the user. Thus, for example, a lower proportion of kaolin would require a thicker coating to give the same amount of light diffusion. Between about 20 parts and 95 parts calcined kaolin and 80 parts and 5 parts of binder, by volume, in the film or other product of the invention, is useful.

The particles of carbon black should be very fine, not more than one micron in size. Large carbon black particles will cause black spatter on the screen. Other well known contrast materials such as black or dark colored pigments, dyes, and acetylene black are useful, but excellent results are obtained with carbon black.

The appearance of the coating composition can vary from almost clear to nearly black, depending on the amount of kaolin and carbon black used and the proportion of one to the other. The physical properties of the light diffusion coating composition depend on the amount of kaolin used in relation to binder, and the viscosity of the binding material, and can vary depending on the proposed method of applying the material to a substrate. As is recognized in the art, thin films of less than one mil in thickness require a coating material having a low viscosity. A wide range of viscosities of the coating composition, such as between about 10 and about 50,000 centistokes, at 25° C. is useful. Of course, other methods of forming the light diffusion devices of the invention are useful. One such method is to mix the kaolin and a thermoplastic resin, such as polyethylene powder, and to extrude a film on conventional melt-extrusion machinery. Another such method is molding by usual procedures for resins.

The thickness of the kaolin containing diffusion film is not particularly critical. A film of from about 0.5 micron to about 20 microns, dry film basis, depending on the desired results, i.e., brightness and light diffusion, has been found to be useful. For the composition used in the example, a thin layer of 0.5 to 5 microns is useful for a rear projection viewing screen, whereas a film of over 5 microns provides light diffusion to a greater extent.

The preferred kaolin, used in the example, is "Ice Cap Kaolin" obtained from the "Thiel Mine" at Sandersville, Ga. Georgia kaolin is preferred and gives the best results.

The preferred Georgia kaolin, prior to calcination, has the following physical properties:

(1) it is a mixture of different mineral crystals, primarily in the form of hexagonal plates and fragments thereof having a maximum dimension of about one micron,
(2) it is generally white, occasionally light cream or pale pink in color,
(3) its density is 2.60,
(4) its index of refraction is 1.56,
(5) its hardness (Moh's scale) is 2.00,
(6) its brightness (General Electric meter) at 457 m$\mu$ is 65–90%.

CHEMICAL ANALYSES OF SOME CLAYS

| Analysis, By Weight | Sedimentary Kaolin, Dry Branch, Ga. | Sedimentary Kaolin, Sandersville, Ga. | English Coating Clay | Residual Kaolin, Spruc Pine, N.C. |
|---|---|---|---|---|
| Moisture and Combined $H_2O$, percent | 13.88 | 14.1 | 13.96 | 14.75 |
| $SiO_2$, percent | 44.52 | 44.85 | 46.14 | 48.52 |
| $Al_2O_3$, percent | 39.27 | 38.27 | 39.20 | 35.92 |
| $Fe_2O_3$, percent | 0.19 | 0.55 | 0.30 | 0.07–1.0 |
| $TiO_2$, percent | 2.14 | 1.98 | None | None |

The above may be considered as reasonably representative for Georgia kaolins and similar clays; Encyclopedia of Chemical Technology, edited by Raymond E. Kirk and Donald F. Othmer, The Interscience Encyclopedia, Inc., vol. 4, 1949, pp. 62–64.

FIGS. 3 and 4 are an incandescent light bulb and a fluorescent tube coated with the novel composition of the invention.

FIG. 5 is a section through a recessed light fixture, showing a diffuser coated with the novel composition of the invention.

FIG. 1 shows a translucent substrate 1 coated with a film 2 composed of a mixture of kaolin, organic binder and a pigment.

FIG. 2 shows a cross section view of a modification of FIG. 1. The transparent and translucent substrate 1a is coated with a film 2 composed of a mixture of kaolin, organic binder and a pigment.

Figure 1:
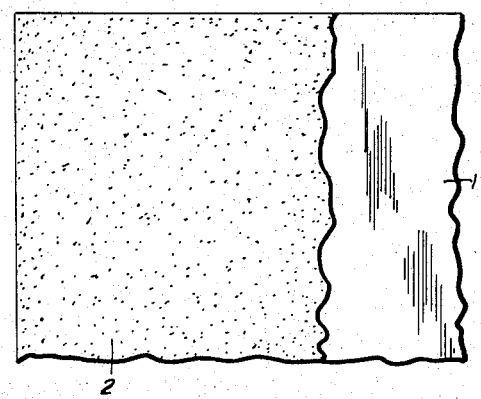
FIG. 1 is a surface view of a translucent substrate coated with a film made according to the invention.
Figure 2:
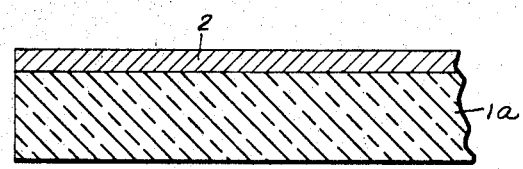
FIG. 2 is a cross section view of a translucent material coated with a film made according to the invention.

FIG. 3 illustrates a conventional type of incandescent electric light bulb 10 having a glass envelope 12 coated with a layer 14 of the calcined kaolin-binder composition of the invention. As has been suggested heretofore, such coating is suitably 5–50 microns in thickness, although thinner and thicker coatings are useful.

FIG. 4 is a view of an electric fluorescent bulb 20, having a glass envelope 22, and a coating 24 similar to that shown in FIG. 3. While the kaolin and carbon black particles are not visible as discrete particles to the naked eye, the drawings are stippled in part for purposes of illustration.

FIG. 5 shows a preferred embodiment of the invention, in the form of a recessed light 30 having a light-transmitting glass or plastic diffuser member 32 coated with the composition of the invention 34. Related types of fixtures, for example hung or mounted on a wall or ceiling, wherein a light diffuser member is between the light source and the space being illuminated, are of course, within the scope of the invention. As has been discussed elsewhere herein, if the diffuser 32 is of a suitable binder material for the calcined kaolin, a separate coating is not necessary, and the diffuser itself is formed of the kaolin-binder composition. The contrast material is preferably omitted for the light diffuser member 32 and similar devices.

The diffuser for electric lights is either a part of the commonly used translucent glass or plastic ornamental devices used for interior or exterior building or vehicle space lighting, or is a part of the light source device in the form of a coating on an incandescent bulb or fluorescent tube. Thus, coatings of the composition of the example, of 20 microns and 50 microns (about 2 mils), dry film thickness, on a clear glass plate, give excellent diffusion when placed in front of a light source, and similar coatings, of the same material and thicknesses, on a clear bulb, for example a 60 watt bulb, gives excellent diffusion. Although the coating composition of the example is best adapted for lower temperatures than encountered on the surface of a light bulb, heat resistant organic binders such as silicone resins of the type used for coating baking pans and polytetrafluoroethylene are of course used as the binder where high temperatures are encountered. Examples of silicones, or polysiloxanes, appear in U.S. Patent 2,816,348.

Any well known method of coating may be used, e.g., spraying, roller coating, dip and drain, etc.; however, the preferred method is spraying such as with about 40 pounds of air pressure.

"Calcined kaolin," as used herein, refers to kaolin which has been heated to a temperature high enough to remove all water, whether said water is free water, bound water, or adsorbed or occluded water.

I claim:

1. A rear projection viewing screen consisting essentially of a substrate coated with a light-transmitting composition made by the process consisting essentially of the steps of heating and dehydrating kaolin, containing about 33% aluminum oxide, to a temperature from about 750° F. to about 1800° F., thereby raising the aluminum oxide content to about 47%, mixing about two parts said kaolin by volume with about one part organic solvent by volume to form a suspension, centrifuging said suspension, 99% or more of said kaolin having a particle size of 1.0 micron or less, agitating and mixing the kaolin with an equal volume of light transmitting organic binder, and adding 0 to 2% colored contrast material.

2. A rear projection viewing screen as in claim 1 wherein the contrast material is carbon black.

3. A novel composition which diffuses transmitted light at about 100% and which consists essentially of a mixture containing 5–80% light transmitting organic binder and 20–95% inorganic solids having at least 99.9% calcined kaolin and 0 to 0.1% carbon black.

4. A novel composition as in claim 3 in which the light transmitting organic binder is a clear organic binder.

5. A novel composition as in claim 4 in which the clear organic binder is polymers or copolymers of methylmethacrylate, and at least 98% of said kaolin is less than one micron in size.

6. A process for making a composition for preparing layers of a light diffusion material consisting essentially of the steps of dehydrating calcined kaolin to remove bound water, 98% or more of said kaolin having a particle size of less than one micron, mixing about ⅔ kaolin with ⅓ clear organic solvent, by volume, suspending the calcined kaolin in the organic solvent, mixing the suspension with an equal volume of light transmitting organic binder and adding from 0 to about 0.1% carbon black in an additional amount of light transmitting organic binder.

7. A process for making a composition of light diffusion material consisting essentially of the steps of heating kaolin, containing about 38% aluminum oxide, from about 750° F. to about 1800° F., thereby raising the aluminum oxide content to about 47%, said kaolin having 98% or more of its particles one micron or less in size, mixing two parts of said kaolin by volume, with one part organic solvent by volume, suspending the kaolin in the organic solvent and centrifuging, agitating and mixing the kaolin with an equal volume of light transmitting organic binder and again agitating, stabilizing the suspension by slowing down the agitation, and adding up to 0.15% carbon black in an additional amount of light transmitting organic binder compound of about 10% carbon black to about 90% light transmitting organic binder.

8. A light illuminating device comprising a light source enclosed in an envelope having a coating of high diffusion material consisting essentially of a mixture of about 20–95% calcined kaolin and a 5–80% light transmitting organic binder and about 0 to about 0.1% carbon black.

9. A method of making a light transmitting device having a coating of light diffusion material consisting essentially of the steps of heating and dehydrating kaolin, containing about 38% aluminum oxide, to at least about 1000° F., thereby raising the aluminum oxide content to about 47%, 98% or more of said kaolin having a particle size of less than one micron, mixing about two parts kaolin by volume with about one part organic solvent by volume, suspending the kaolin in the organic solvent and centrifuging, discarding any coarse fraction, 99% or more of said kaolin having a particle size of 1.0 micron or less, agitating and mixing the kaolin with an equal volume of light transmitting organic binder solution containing about 20% by weight of binder, and again agitating, stabilizing the suspension by slowing down the agitation, and applying a coating of said suspension to a light-transmitting substrate, and drying said coating.

10. A light illuminating device consisting essentially of a light source enclosed in an envelope having a coating of light diffusion material on said envelope and composed of a mixture of calcined kaolin, having a particle size, of 99% thereof by weight, of less than one micron, and a light transmitting organic binder.

11. A process for making a light emitting device consisting essentially of the steps of coating a light transmitting element of said device with a light diffusion material made by the process consisting essentially of the steps of heating and dehydrating kaolin, containing about 38% aluminum oxide, from about 750° F. to about 1800° F., thereby raising the aluminum oxide content to about 47%, mixing about two parts kaolin by volume with about one part organic solvent by volume, suspending the kaolin in the organic solvent and centrifuging, discarding any coarse fraction to get 99% or more of said kaolin having a particle size of 1.0 micron or less, agitating and mixing the kaolin with an equal volume of light transmitting polymeric binder solution containing about 20 parts by weight of the polymeric binder and about 80 parts organic solvent, and again agitating, stabilizing the suspension by slowing down the agitation and applying said suspension to the light transmitting element.

12. A light diffusion device consisting essentially of a substrate coated with a light-transmitting composition made by the process consisting essentially of the steps of heating kaolin, containing about 38% aluminum oxide, from about 750° F. to about 1800° F., thereby raising the aluminum oxide content to about 47%, mixing about two parts of said kaolin by volume with about one part volatile organic solvent by volume, suspending the kaolin in the organic solvent, centrifuging the suspension to get 99% or more of said kaolin as particles having a particle size of 1.0 micron or less, agitating and mixing the kaolin with an equal volume of light transmitting organic binder solution consisting essentially of about 80 parts volatile organic solvent and 20 parts binder by weight, adding about 0.1% carbon black in an additional amount of organic binder composed of about 10% carbon black and about 90% of said organic binder solution.

(References on following page)

References Cited

UNITED STATES PATENTS

| | | | |
|---|---|---|---|
| 445,528 | 2/1891 | Akester | 108—193 |
| 1,509,481 | 9/1924 | Petow | 117—159 |
| 1,926,923 | 9/1933 | Suzuki | 350—126 |
| 2,009,600 | 7/1935 | Ximenez | 106—193 |
| 2,086,729 | 7/1937 | Moss | 106—193 |
| 2,102,595 | 12/1937 | Hitt et al. | 106—193 |
| 2,125,951 | 8/1938 | Parry | 106—193 |
| 2,133,076 | 10/1938 | Bodde | 88—28.93 |
| 2,292,152 | 8/1942 | Newcomer | 88—28.93 |
| 2,379,499 | 7/1945 | Smith | 88—28.93 |
| 2,706,262 | 4/1955 | Barnes | 117—159 X |
| 2,716,614 | 8/1955 | O'Connell | 106—168 X |
| 2,989,492 | 6/1961 | Sanderson | 117—161 |
| 2,995,459 | 8/1961 | Soloway | 106—291 X |
| 3,008,844 | 11/1961 | Grunin et al. | 106—291 X |
| 3,083,115 | 3/1963 | Bader | 106—195 X |
| 3,171,718 | 3/1965 | Gunn et al. | 106—72 X |

FOREIGN PATENTS

| | | |
|---|---|---|
| 249,911 | 10/1962 | Australia. |
| 866,326 | 4/1961 | Great Britain. |

ALEXANDER H. BRODMERKEL, *Primary Examiner.*

D. J. ARNOLD, *Examiner.*

J. H. WOO, *Assistant Examiner.*